(12) United States Patent
Wall et al.

(10) Patent No.: US 10,744,439 B2
(45) Date of Patent: Aug. 18, 2020

(54) COMPOUND AIR FILTER AND METHOD OF REMOVING AIRBORNE MOLECULAR CONTAMINANTS AND VOLATILE ORGANIC COMPOUNDS THEREFROM

(71) Applicant: K&N Engineering, Inc., Riverside, CA (US)

(72) Inventors: Jere James Wall, Helendale, CA (US); Steve Williams, Cherry Valley, CA (US)

(73) Assignee: K&N Engineering, Inc., Riverside, CA (US)

( * ) Notice: Subject to any disclaimer, the term of this patent is extended or adjusted under 35 U.S.C. 154(b) by 80 days.

(21) Appl. No.: 15/632,122

(22) Filed: Jun. 23, 2017

(65) Prior Publication Data

US 2017/0368488 A1 Dec. 28, 2017

Related U.S. Application Data

(60) Provisional application No. 62/354,549, filed on Jun. 24, 2016.

(51) Int. Cl.
*B01D 46/00* (2006.01)
*B03C 9/00* (2006.01)
(Continued)

(52) U.S. Cl.
CPC ......... *B01D 46/0005* (2013.01); *B01D 27/08* (2013.01); *B01D 46/0016* (2013.01);
(Continued)

(58) Field of Classification Search
CPC .......................... B01D 46/0005; B01D 46/002
(Continued)

(56) References Cited

U.S. PATENT DOCUMENTS 2,599,604 A * 6/1952 Bauer .................. B01D 25/001
210/494.1
3,198,336 A * 8/1965 Hyslop .................. B01D 29/21
210/457
(Continued)

FOREIGN PATENT DOCUMENTS

EP           1952869 A1 *  8/2008  ............. B01D 27/06
WO     WO-9633001 A1 * 10/1996  ............. B01D 29/15
WO  WO-2016077338 A1 *  5/2016  ............. B32B 5/022

OTHER PUBLICATIONS

International Search Report from Patent Application No. PCT/US2017/039121 dated Aug. 28, 2017.

*Primary Examiner* — Edelmira Bosques
*Assistant Examiner* — Phillip Decker
(74) *Attorney, Agent, or Firm* — Rutan & Tucker LLP; Hani Z. Sayed (57) ABSTRACT

An apparatus and a method are provided for a heating, ventilation, and air conditioning (HVAC) air filter to remove airborne molecular contaminants and volatile organic compounds (VOCs) from air within building spaces is disclosed. The air filter comprises a support frame having a shape and size suitable to orient the air filter within a HVAC system. A compound filter medium is retained within the support frame to remove the airborne molecular contaminants and VOCs from air flowing through the HVAC system. A method of removing airborne molecular contaminants and volatile organic compounds (VOCs) from air is disclosed that includes an operation of coupling a first media layer, comprising uniformly disposed pleats, with a second media layer, comprising a woven fiber material, so as to form a compound filter medium.

7 Claims, 4 Drawing Sheets

(51) Int. Cl.
| | |
|---|---|
| *B01D 46/10* | (2006.01) |
| *B01D 46/52* | (2006.01) |
| *B01D 27/08* | (2006.01) |
| *B01D 46/02* | (2006.01) |
| *B01D 53/02* | (2006.01) |
| *F02M 35/024* | (2006.01) |

(52) U.S. Cl.
CPC ......... *B01D 46/0036* (2013.01); *B01D 46/02* (2013.01); *B01D 46/10* (2013.01); *B01D 46/521* (2013.01); *B01D 53/02* (2013.01); *B03C 9/00* (2013.01); *F02M 35/024* (2013.01); *B01D 46/00* (2013.01); *B01D 2239/0613* (2013.01); *B01D 2239/0618* (2013.01); *B01D 2253/10* (2013.01); *B01D 2253/102* (2013.01); *B01D 2257/708* (2013.01); *B01D 2258/06* (2013.01); *B01D 2259/4566* (2013.01); *B01D 2265/06* (2013.01); *B01D 2275/10* (2013.01); *B01D 2279/40* (2013.01)

(58) Field of Classification Search
USPC ........................................................ 454/228
See application file for complete search history.

(56) References Cited

U.S. PATENT DOCUMENTS

| | | | | |
|---|---|---|---|---|
| 4,268,290 | A * | 5/1981 | Barrington | B01D 46/2411 210/493.1 |
| 4,452,619 | A | 6/1984 | Wright et al. | |
| 5,066,400 | A * | 11/1991 | Rocklitz | B01D 29/012 210/493.5 |
| 5,084,178 | A * | 1/1992 | Miller | B01D 29/012 210/493.5 |
| 5,240,479 | A * | 8/1993 | Bachinski | A62B 23/02 128/206.12 |
| 5,674,393 | A * | 10/1997 | Terhune | B01D 27/06 210/315 |
| 5,704,955 | A | 1/1998 | Giles | |
| 5,744,036 | A * | 4/1998 | Choi | B01D 29/012 156/292 |
| 6,156,089 | A * | 12/2000 | Stemmer | B01D 46/0036 55/467 |
| 6,315,805 | B1 * | 11/2001 | Strauss | B01D 39/1623 55/486 |
| 6,712,870 | B1 * | 3/2004 | Stamey, Jr. | B01D 46/24 55/357 |
| 6,824,581 | B1 | 11/2004 | Tate et al. | |
| 6,887,343 | B2 * | 5/2005 | Schukar | B01D 29/012 156/195 |
| 7,122,068 | B2 * | 10/2006 | Tate | B01D 46/10 55/497 |
| 7,425,227 | B1 * | 9/2008 | Hutchison | B01D 46/10 55/385.3 |
| 7,588,619 | B2 * | 9/2009 | Chilton | B01D 46/528 55/385.3 |
| 7,909,954 | B2 * | 3/2011 | Johnston | B01D 25/001 156/195 |
| 8,062,403 | B2 | 11/2011 | Goode | |
| 8,231,700 | B2 * | 7/2012 | Sundet | B01D 39/1623 55/487 |
| 8,968,445 | B2 * | 3/2015 | Lindahl | B01D 39/1623 55/486 |
| 9,174,159 | B2 * | 11/2015 | Sanocki | B01D 46/521 |
| 9,266,048 | B2 * | 2/2016 | Kaddour | B01D 46/0023 |
| 2004/0194441 | A1 | 10/2004 | Kirsch | |
| 2006/0021302 | A1 * | 2/2006 | Bernard | B01D 46/0028 55/282 |
| 2010/0269468 | A1 * | 10/2010 | Crabtree | B01D 46/10 55/499 |
| 2011/0146490 | A1 * | 6/2011 | Derstler | B01D 46/0024 95/286 |
| 2014/0260144 | A1 * | 9/2014 | Williams | B01D 46/0005 55/502 |
| 2014/0260982 | A1 | 9/2014 | Williams et al. | |
| 2015/0075384 | A1 * | 3/2015 | Park | B01D 53/885 96/224 |
| 2015/0078964 | A1 * | 3/2015 | Meirav | B01J 20/28035 422/120 |
| 2016/0129381 | A1 * | 5/2016 | Gao | B01D 39/1623 55/385.2 |
| 2017/0021298 | A1 * | 1/2017 | Williams | B01D 46/10 |
| 2017/0368490 | A1 * | 12/2017 | Wall | B01D 46/0005 |

* cited by examiner

COMPOUND AIR FILTER AND METHOD OF REMOVING AIRBORNE MOLECULAR CONTAMINANTS AND VOLATILE ORGANIC COMPOUNDS THEREFROM

CROSS-REFERENCE

This application claims the benefit of U.S. Provisional Patent Application No. 62/354,549, filed Jun. 24, 2016, titled, "COMPOUND AIR FILTER," which is hereby incorporated by reference herein in its entirety.

FIELD

The field of the present disclosure generally relates to filter devices. More particularly, the field of the invention relates to an apparatus and a method for a compound air filter configured to resist deformation of pleats of the air filter during installation and use so as to preserve an optimal filtration efficiency.

BACKGROUND

An air filter designed to remove particulate matter from an airstream generally is a device comprising fibrous materials. These fibrous materials can remove solid particulates such as dust, pollen, mold, and bacteria from an airstream. Air filters are used in applications where air quality is important, notably in heating, ventilation, and air conditioning (HVAC) systems of buildings. HVAC systems generally operate to provide optimal interior air quality to occupants within interior spaces of buildings. HVAC systems achieve optimal interior air quality by conditioning air, removing particle contaminants by way of ventilation and filtration of air, and providing a proper interior pressurization.

While there are many different HVAC system designs and operational approaches, and each building design is unique, HVAC systems generally share a few basic design elements. For example, outside air ("supply air") generally is drawn into a HVAC system through an air intake. Once in the HVAC system, the supply air is filtered to remove particle contaminants, then heated or cooled, and then circulated throughout the interior space of the building by way of an air distribution system. Many air distribution systems comprise a return air system configured to draw air from the interior building space and return the air ("return air") to the HVAC system. The return air may then be mixed with supply air and then filtered, conditioned, and circulated throughout the interior space of the building. In some instances, a portion of the air circulating within the building may be exhausted to the exterior so as to maintain a desired barometric pressure within the building.

As will be appreciated, the effectiveness of the HVAC system to provide an optimal interior air quality depends largely on an ability of an air filter within the HVAC system to remove particle contaminants from the air within the building. A HVAC system air filter typically comprises fibrous materials configured to remove solid particulates, such as dust, pollen, mold, and bacteria from the air passing through the HVAC system. Filters may be made from paper, foam, cotton, spun fiberglass, or other known filter materials. The filter material may also be pleated so as to increase the surface area and, accordingly, increase the efficiency of the filter. As will be appreciated, an increase in the number of pleats for a given area will proportionally increase the surface area and therefore the efficiency of the filter.

A drawback to conventional HVAC system air filters is that, as the number or density of pleats increases the ability to maintain a uniform distribution of the pleats within the filter material generally decreases. Even light forces applied to a densely pleated filter, either from handling during installation of the filter unit or from air flow pressure during use, may dent or bend the pleats out of position. Where pleats are compressed together the surface area of the filter will be decreased, along with the efficiency of the filter. This decrease in efficiency may reduce the effective life of a filter is prompting the filter to be discarded prematurely in an effort to increase HVAC system airflow and thus decrease operation costs. Considering the innumerable number of buildings with HVAC systems throughout the world, the volume of discarded air filters that could be eliminated from landfills is staggering.

What is needed, therefore, is a compound air filter that is configured to maintain a uniform distribution of pleats, during installation and use, in order to maximize surface area and overall efficiency of the filter.

SUMMARY

Provided herein, is a heating, ventilation, and air conditioning (HVAC) air filter to remove airborne molecular contaminants from air within a building, the filter comprising a support frame comprised of a shape and size suitable for orienting the air filter within a HVAC system, a first media layer retained within the support frame and configured to remove the airborne molecular contaminants from air flowing through the HVAC system, wherein at least a portion of the first media layer is in a pleated configuration; a second media layer coupled with the first media layer so as to maintain a uniform distribution of pleats of the first media layer; and one or more support layers coupled with any of the first and second media layers and configured to resist deformation of the pleats so as to preserve an optimal filtration efficiency.

In an aspect of the invention, the air filter may include wherein a support frame which is comprised of a substantially rectangular shape. In an aspect of the invention, the air filter may include wherein the support frame comprises of a single molded rim extending along a perimeter of the first media layer. In an aspect of the invention, the air filter may include wherein the molded rim is retaining a wire mesh coupled with the first media layer. In an aspect of the invention, the air filter may include wherein the molded rim is comprised of any one of foam rubber, silicone rubber, and integral skin polyurethane foam rubber. In an aspect of the invention, the air filter may include wherein the first media layer is comprised of any of paper, foam, cotton, spun fiberglass, woven, and synthetic or natural material.

In an aspect of the invention, the air filter may include wherein the first media layer may include embossed shapes disposed between adjacent pleats. In an aspect of the invention, the air filter may include wherein the embossed shapes are longitudinally aligned such that apices of adjacent pleats contact one another so as to maintain the pleats in a spaced configuration. In an aspect of the invention, the air filter may include wherein the embossed shapes are comprised of adhesive strips configured to maintain their original shape and adhere adjacent of the pleats. In an aspect of the invention, the air filter may include wherein the second media layer is comprised of any of a woven synthetic layer, a woven cotton layer, or other suitable material. In an aspect of the invention, the air filter may include wherein the second media layer is adhered to the first media layer by way of one or more lines of a suitable adhesive disposed perpendicular to the pleats and extending along a width of the first medial layer.

In an aspect of the invention, the air filter may include a heating, ventilation, and air conditioning (HVAC) air filter to remove airborne molecular contaminants and volatile organic compounds (VOCs) from air within an enclosed space, the air filter comprising a support frame comprising a shape and size suitable for orienting the air filter within a HVAC system; a compound filter medium comprising at least two filter media layers, that are retained within the support frame and configured to remove the airborne molecular contaminants and VOCs from air flowing through the HVAC system, at least one of the at least two media layers comprises of a multiplicity of pleats; and a support layer coupled with the compound filter medium and configured to maintain a uniform distribution of the multiplicity of pleats.

In an aspect of the invention, the air filter may include wherein the supportive layer is configured to provided minimal resistance to air flowing through the air filter. In an aspect of the invention, the air filter may include wherein at least one of the at least two filter media layers is configured to remove volatile organic compounds (VOCs) from and airstream. In an aspect of the invention, the air filter may include wherein the filter includes an electrostatic component.

In an aspect of the invention, a method of removing airborne molecular contaminants and volatile organic compounds (VOCs) from air, the method comprising coupling a first media layer, comprising uniformly disposed pleats, with a second media layer, comprising a woven fiber material, so as to form a compound filter medium, incorporating one or more support layers into the compound filter medium to impart relatively greater structural integrity to the air filter, extending a support frame along a perimeter of the compound filter medium; and configuring the support frame to retain the compound filter medium and orient the air filter within a HVAC system.

In an aspect of the invention, the method may include wherein extending further comprises molding a rim onto the perimeter such that the compound filter medium is retained therein. In an aspect of the invention, the method may include wherein coupling further comprises extending lines of suitable adhesive along a width of the first media layers, perpendicular to the pleats, so as to adhere the second media layer to the first media layer.

BRIEF DESCRIPTION OF THE DRAWINGS

The drawings refer to embodiments of the present disclosure in which.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "a first media layer," may be made. However, the specific numeric reference should not be interpreted as a literal sequential order but rather interpreted that the "first media layer" is different than a "second media layer." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes an apparatus and a method for a heating, ventilation, and air conditioning (HVAC) air filter to remove airborne molecular from air within residential or commercial spaces. The HVAC air filter comprises a support frame having a shape and size suitable to orient the HVAC air filter within a HVAC system. A filter medium is retained within the support frame and configured to remove the airborne molecular contaminants from air flowing through the HVAC system. The support frame may comprise a single molded rim disposed along a perimeter of the filter medium and may be configured to orient the filter medium within the HVAC system, such that air flowing through the HVAC system is passed through the filter medium. The air filter may include a support layer, incorporated into the air filter and configured to provide strength and durability to the air filter, the support layer may be made from wire or any similar suitable material. The filter medium generally comprises a combination of one or more media layers configured to exhibit a relatively high filtration efficiency and a relatively low air pressure drop across the filter medium. The filter medium may include a plurality of pleats so as to increase the surface area of the filter medium. The air filter may also include at least one of a support layer and a second media layer, configured to maintain a uniform distribution of the pleats.

Although embodiments of the present invention may be described and illustrated herein in terms of a rectangular air filter, it should be understood that the present invention is not to be limited to the exact embodiments or shapes illustrated, but rather the present invention may include a wide variety of generally rectangular shapes, generally square, circular, oval, round, curved, conical, or other closed perimeter shape that will become apparent. Moreover, embodiments as described herein are not limited to use with an HVAC system, and may find applicability in any of various other filtration systems configured to treat a large volume of air.

Figure 1:
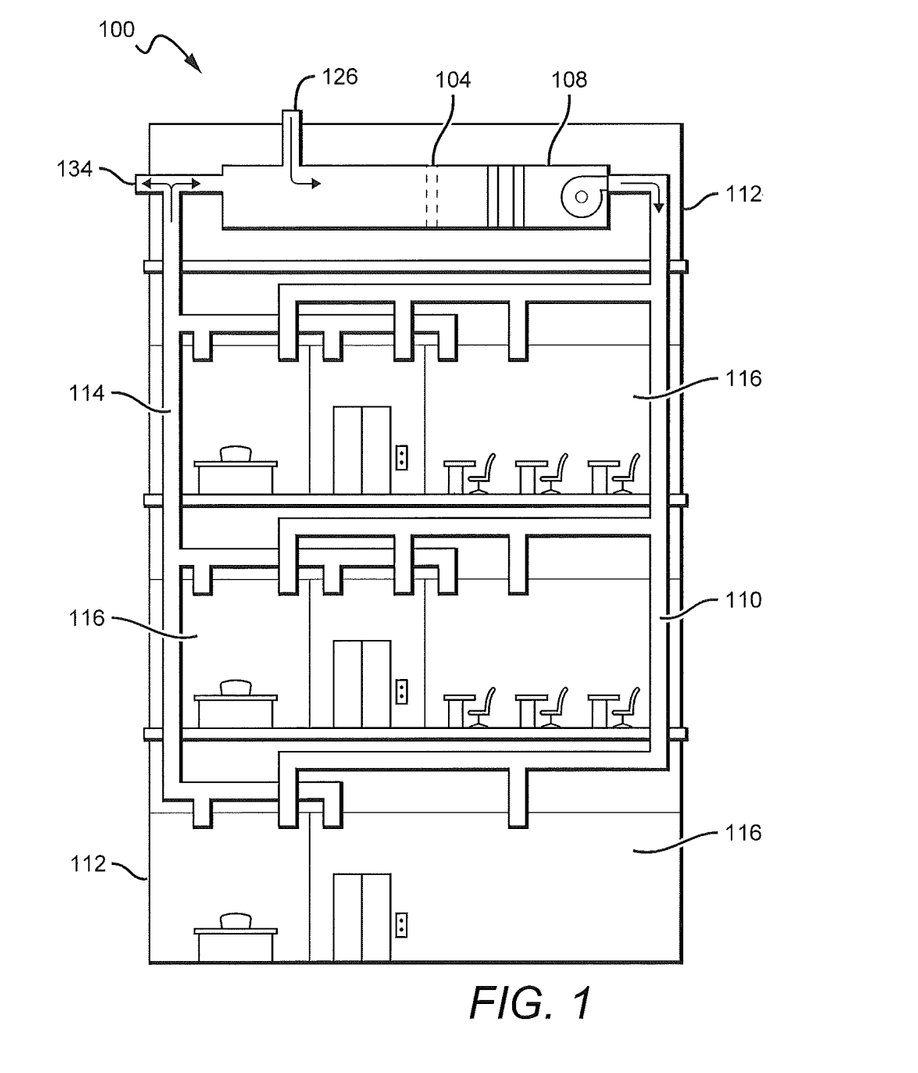
FIG. 1 illustrates a cross-sectional view of an exemplary use environment wherein a HVAC system air filter is incorporated into a HVAC system of a building, according to the present disclosure.

FIG. 1 illustrates an exemplary use environment 100 wherein an air filter 104 is incorporated into a HVAC system 108 of a building 112 so as to clean an airstream drawn through the air filter 104. Although the building 112 illustrated in FIG. 1 comprises a multi-story office building, it should be understood that the building 112 may comprise any of various inhabitable structures, such as residential homes, apartments, condominiums, and the like. After passing through the air filter 104, the airstream is routed into one or more building spaces 116 by way of a supply ductwork 110. Air within the building spaces 116 is routed back to the HVAC system 108 by way of a return ductwork 114. It will be appreciated that the building 112 may comprise multiple stories, each of which may include one or more building spaces 116, as illustrated in FIG. 1, or may comprise a single story building, including but not limited to a detached residential home.

Figure 2:
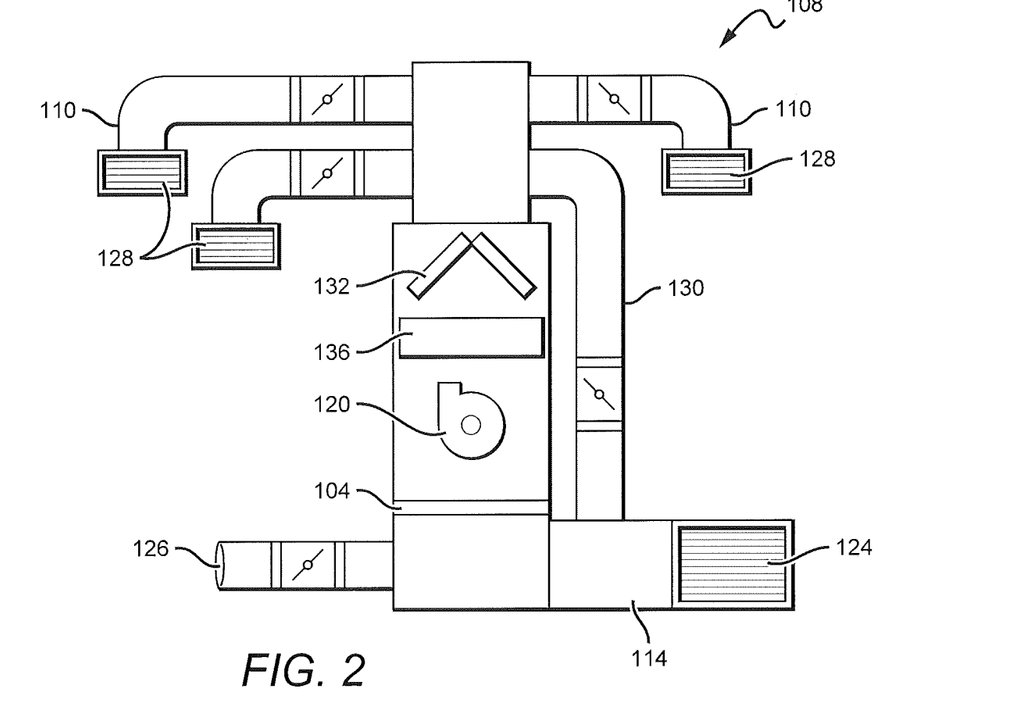
FIG. 2 illustrates a schematic view of an exemplary embodiment of a HVAC system comprising a HVAC home air filter in accordance with the present disclosure.

FIG. 2 illustrates a schematic view of an exemplary embodiment of a HVAC system 108 that may be used to clean air within building spaces 116. In other embodiments, however, the HVAC system 108 may be configured to clean air within interior spaces of any of a wide variety of buildings without limitation. The HVAC system 108 generally comprises a fan 120 configured to draw a return airstream 124 from the building spaces 116 through the air filter 104 whereby airborne molecular contaminants or other particle contaminants are removed from the airstream. Particle contaminants removed from the return airstream 124 are entrapped in the air filter 104. The fan 120 then pushes a clean airstream 128 through an air conditioning system 132 and a heater core 136 and then into the building spaces 116. As will be appreciated, the air conditioning system 132 and the heater core 136 facilitate providing a consistent, comfortable temperature within the building spaces 116 by respectively cooling and heating the clean airstream 128, as needed. As further shown in FIG. 2, the return airstream 124 may be combined with an outside airstream 126, as well as with a bypass airstream 130 so as to maintain a desired barometric pressure within the HVAC system 108 and within the building spaces 116. In some embodiments, an exhaust airstream 134 may be further incorporated into the HVAC system 108 so as to maintain the desired barometric pressure and to allow entry of the outside airstream 126.

Figure 3:
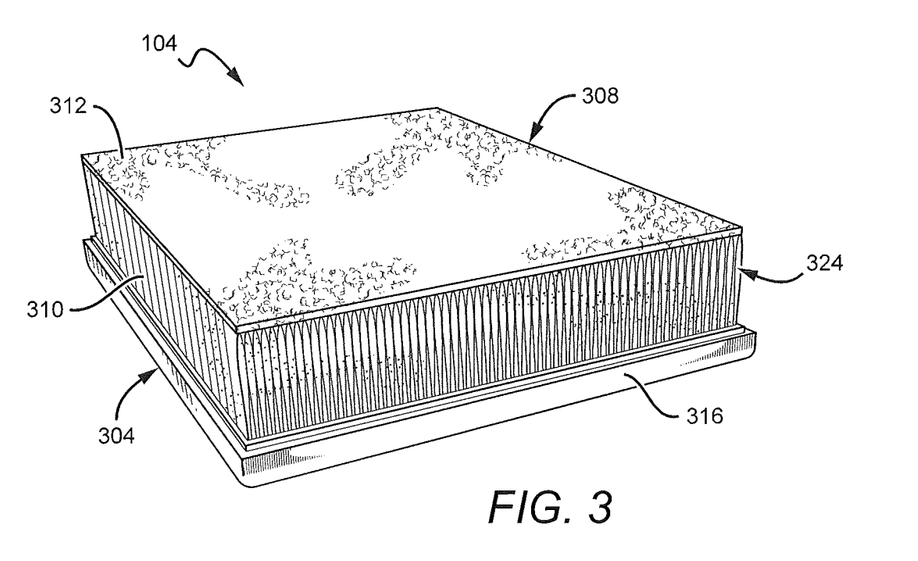
FIG. 3 illustrates a downstream perspective view of an exemplary embodiment of an air filter configured for use in a HVAC system of a building, according to the present disclosure.
Figure 4:
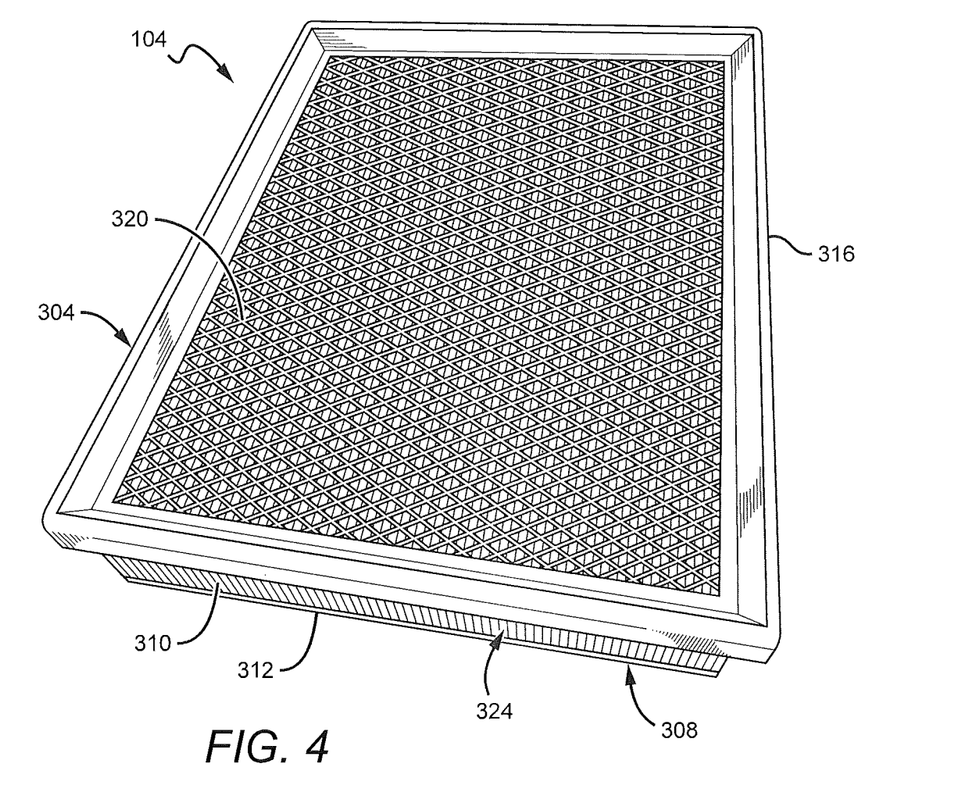
FIG. 4 illustrates an upstream perspective view of an exemplary embodiment of an air filter configured for use in a HVAC system of a building, according to the present disclosure.

FIGS. 3 and 4 illustrate an exemplary embodiment of an air filter 104 that is configured for use in embodiments of the HVAC system 108 incorporated into a building. The air filter 104 comprises a support frame 304 having a shape and size suitable to orient the HVAC air filter within the HVAC system 108. A filter medium 308 is retained within the support frame 304 and configured to remove airborne molecular contaminants from air flowing through the HVAC system 108. The support frame 304 may be comprised of a single molded rim 316 that is disposed along a perimeter of the filter medium 308. It is understood that the molded rim 316 may be formed from molded foam rubber, silicone rubber, integral skin polyurethane foam rubber; or any of various similar materials that are known in the art. In some embodiments, the support frame 304 may be comprised of a plurality of elongate sections and corner sections suitably assembled along a perimeter of the filter medium to orient the air filter 104 within the HVAC system 108.

As best shown in FIG. 4, the air filter 104 may include a support layer, such as wire mesh 320, which is incorporated into the air filter 104 and configured to provide strength and durability to the medium 308. Although the wire mesh 320 shown in FIG. 4 is molded into the support frame 304, it should be understood that the wire mesh 320 may be coupled with the support frame 304 by way of any of various techniques that are known in the art. Further, it should be recognized that the size of mesh of the wire mesh 320 may be varied from that shown in FIG. 4, based on design choice.

In some embodiments two or more layers of wire mesh may be used to provide relatively greater support to the air filter 104. For example, one or more layers of wire mesh may be disposed in front of, behind, or within the filter medium 308 with respect to the direction of airflow. It is contemplated that situating one or more layers of wire mesh 320 in front of the filter medium 308, with respect to the direction of airflow, may operate to catch larger particulate matter, thereby removing this particulate matter from the airstream prior to passing into filter medium 308.

It is contemplated that any of a variety of adhesives, fasteners or structures may be implemented so as to retain the filter medium 308 within the support frame 304. In some embodiments, for example, the support frame 304 may comprise a grate, or a similar structure, which encloses the filter medium 308 within the support frame 304 without restricting airflow through the filter medium 308. In some embodiments, the filter medium 308 may be coupled with a wire support, for example the wire mesh 320, that is configured to resist bowing of the filter medium due to the airstream passing therethrough. For example, the filter medium 308 may be disposed between a first wire support and a second wire support. The first and second wire supports may be comprised of a rigid material, such as, by way of non-limiting example, any of various suitable plastics or metals.

In some embodiments, the molded rim 316 may be molded directly onto the edges of the filter medium 308 so as to retain the filter medium within the support frame 304. In some embodiments, the molded rim 316 may be molded onto a first support layer, such as the wire mesh 320, a second support layer, the filter medium 308, or any combination thereof. For example, in those certain embodiments wherein the filter medium 308 is disposed between a first support layer and a second support layer, the molded rim 316 may be molded onto the first and second support layers to retain the filter medium 308 within the support frame 304. Further, in some embodiments, the support frame 304 may comprise a crimped portion that folds onto and retains the first and second support layers and this retains the filter medium 308 within the support frame 304.

As discussed above, a first support layer, such as the wire mesh 320, may be coupled with the filter medium 308 so as to provide additional strength and durability to the air filter 104. It is envisioned that in some embodiments, the wire mesh 320 may be positioned on an outer surface and an inner surface of the filter medium 308. In some embodiments, the wire mesh 320 may be comprised of powder-coated aluminum screen wire that is co-pleated along with the filter medium 308 so as to reinforce the air filter 104. In some embodiments, at least a portion of the filter medium 308 may be attached to the support layer by way of adhesives or other fasteners as described herein. This may, advantageously, further assist in maintaining a uniform distribution of pleats of the filter medium 308. In some embodiments, the inner surface of the filter medium 308 may also comprise a wire mesh reinforcement. It is contemplated that the wire mesh supports may vary in rigidity. In some embodiments, additional or alternative reinforcements may be provided, as will be apparent to those skilled in the art.

Figure 5:
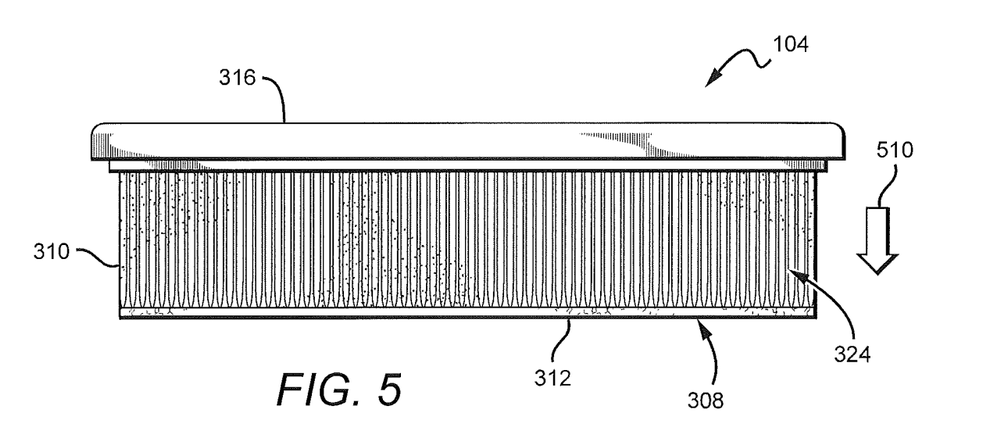
FIG. 5 is a side view of the air filter shown in FIGS. 3-4, illustrating a direction of airflow through the air filter, according to the present disclosure.
Figure 6:
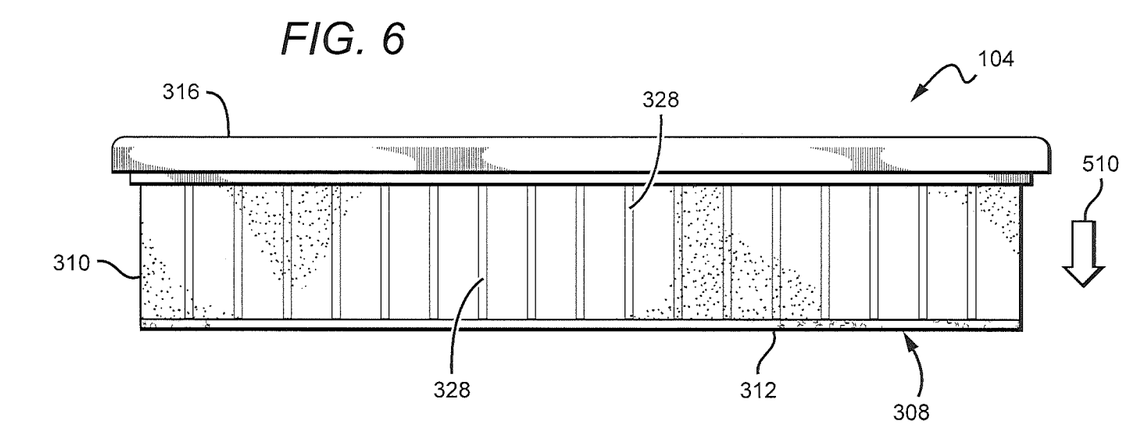
FIG. 6 is a side view of the air filter shown in FIGS. 3-4, illustrating a direction of airflow through the air filter, according to the present disclosure.

FIGS. 5 and 6 illustrate side views of the air filter 104, indicating a direction of airflow 510 passing through the filter medium 308. The filter medium 308 generally comprises a combination of one or more filter media layers configured to exhibit a relatively high filtration efficiency and a relatively low air pressure drop across the filter medium 308. In the embodiments illustrated in FIGS. 3-7, the filter medium 308 is comprised of a first media layer 310 and a second media layer 312. The first media layer 310 may include a multiplicity of pleats 324 so as to increase the surface area of the filter medium. It will be appreciated that an increase in the number or density of the pleats 324 increases the surface area of the filter medium 308. It is contemplated that the first media layer 310 may be constructed of paper, foam, cotton, hemp, spun fiberglass, or other filter materials known in the art, woven or non-woven material, synthetic or natural, or any combination thereof. In some embodiments the first media layer 310 may be configured to remove volatile organic compounds (VOCs) from the airstream. For example, in some embodiments, the first media layer 310 may be comprised of a portion capable of removing VOCs from the airstream. It is envisioned that embodiments of the first media layer 310 may include components capable of removing VOCs from the airstream comprising of activated charcoal or similar materials known in the art.

In some embodiments the first media layer 310 may be comprised of an electrostatic portion that is configured to electrostatically attract and agglomerate particle contaminants within the air flowing through the HVAC system 108. It is contemplated that the electrostatic portion may be comprised of at least some fibers that are treated with a coating of antimicrobial molecules configured to destroy microbes. In some embodiments, the antimicrobial molecules may be comprised of positively charged molecules distributed around a circumference some fibers of the first media layer 310 and configured to cooperate with polarized fibers disposed within the filter medium 308.

In some embodiments, the first media layer 310 may be comprised of a combination of one or more media layers, each having a unique appearance. The combination of one or more media layers may be configured to exhibit a relatively high filtration efficiency and a relatively low air pressure drop across the filter medium 308, and the unique appearance may be configured to indicate a preferred direction of airflow 510 through the filter medium 308. In one embodiment, the combination of one or more media layers comprises a first media layer and a second media. The first media layer includes a cream color and the second media layer includes a grey color layer. As will be appreciated, the cream color indicates an air entry side of the filter medium 308, and the grey color indicates an air exit side of the filter medium. It will be recognized that a variety of colors, shapes, symbols, logos, written instructions or the like may be used, without limitation, to indicate a preferred air entry side of the filter medium 308.

Figure 7:
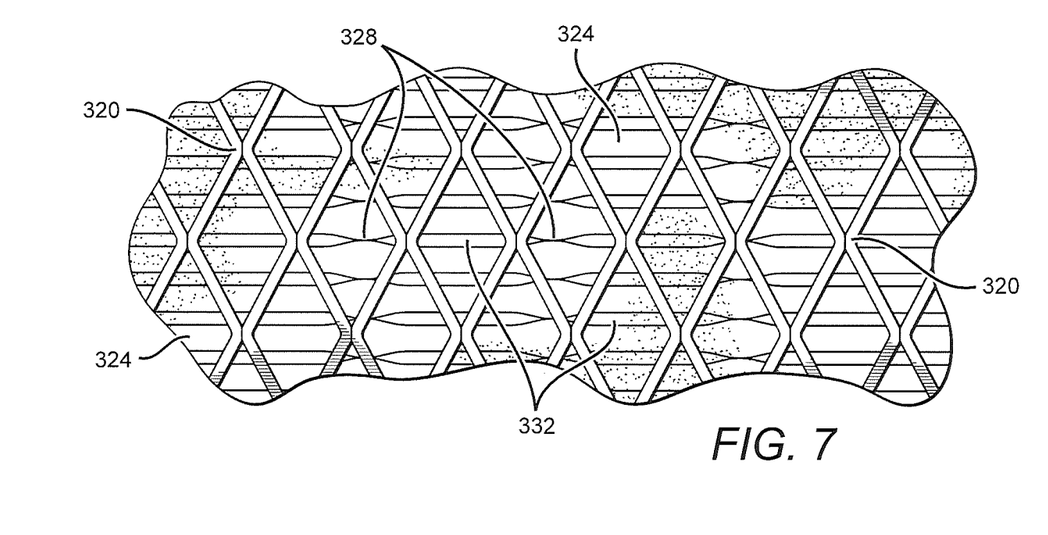
FIG. 7 illustrates a close-up view of a plurality of pleats comprising the air filter of FIGS. 3-4, according to the present disclosure.

As best shown in FIGS. 6 and 7, the first media layer 310 may include a multiplicity of embossed shapes 328. The embossed shapes 328 are positioned in between the fold lines of the pleats 324 such that they are disposed substantially on the sides of the pleats when the first media layer 310 is in a folded configuration. The embossed shapes 328 of adjacent pleats 324 are longitudinally aligned such that the apices of opposing embossed shapes 328 are in contact when the first media layer 310 is in the folded configuration. These embossed shapes 328 aide in maintaining the pleats in a spaced configuration 332 while maintaining a minimal loss in surface area as well as operating to impart structural integrity to the first media layer 310. In some embodiments, the embossed shapes 328 are comprised of adhesive beads or strips, configured to advantageously maintain a majority of their original shape while adhering adjacent pleats 324. Advantageously, the adhesive beads or strips may further aide in directing the airflow through the filter, and may prevent airflow from escaping laterally, perpendicular to the direction of airflow 510. While the embossed shapes 328 in the present embodiment are disclosed as uniform, longitudinal and orientated substantially parallel with the direction of airflow 510, it should be understood that any combination of orientation, shape and number of the embossed shapes 328 fall within the spirit and scope of the present disclosure.

As described above, the filter medium 308 is comprised of a second media layer 312 which may be coupled with the first media layer 310. Second media layer 312 may be configured to maintain a uniform distribution of the pleats 324, as best shown in FIG. 5. Preferably, the second media layer 312 is comprised of a woven, fibrous material adhered to a down-stream side of the first media layer 310, with respect to the direction of airflow 510.

It should be understood that the second media layer 312 may be comprised of materials other than the above mentioned woven, fibrous material. Rather, the material comprising the second media layer 312 may be any material that is suitable for maintaining a uniform distribution of the pleats 324 while providing little or no resistance to airflow. For example, the second media layer 312 may be comprised of synthetic or natural materials, organic or inorganic materials, rigid or flexible materials, cotton fabric, nylon fabric, wire mesh, perforated plastic sheet, and the like.

It is contemplated that the second media layer 312 may be adhered to the first media layer 310 by way of any suitable fixation means known in the art, such as by way of non-limiting examples any of glue, clips, staples, sewing, pins and the like. It is contemplated that the second media layer 312 may be affixed to the first media layer 310 by way of any one, or a combination of, the suitable fixation configurations. In one embodiment, the second media layer 312 is adhered to the first media layer 310 by way of one or more lines of a suitable adhesive disposed perpendicular to the pleats 324 and extends along a width of the first media layer 310. In some embodiments the second media layer 312 may be adhered to the first media layer 310 by way of one or more lines of a suitable adhesive disposed along the down-stream apices of the pleats, that is to say lines of adhesive are orientated parallel with the folds of the pleats. It is contemplated that any suitable adhesive may be used to adhere the first and second media layers 310, 312, without limitation. In some embodiments, the first and second media layers may be mechanically fastened together by way of, for example, a multiplicity of staples, one or more lines of thread, or a combination thereof. In some embodiments the second media layer may include perforations or openings so as to further improve air flow. Any number, shape, distribution or pattern of perforations or openings in the second media layer are contemplated to fall within the scope of the present invention. In some embodiments, the second media layer may consist of one or more lines of a suitable adhesive disposed perpendicular to the pleats 324 and extending along a width of the first media layer 310. It is contemplated that the one or more lines of adhesive or the mechanical fastenings may also be arranged at a non-perpendicular angle to the arrangement of the pleats, such as, for example, a diagonal angle across the pleats. In some embodiments, the second media layer may consist of the suitable fixation means known in the art, such as by way of non-limiting examples any of glue, clips, staples, sewing, pins and the like. In some embodiments, the second media layer may consist of the mechanical fastening such as, by way of non-limiting examples, a multiplicity of staples, one or more lines of thread, combinations thereof, or the like. In some embodiments, the second media layer may act as a further layer of filtration.

In some embodiments, at least some of the fibers comprising the second media layer 312 may be treated with a coating of antimicrobial molecules configured to destroy microbes on contact. Preferably, the coating of antimicrobial molecules surrounds substantially the entire circumference of each fiber strand that is treated. In some embodiments, substances configured to release a fragrance may be incorporated into the second media layer 312 comprising the antimicrobial molecules. It is contemplated that the fragrance may be any natural substance, synthetic material, (incorporating aldehydes, ketones, esters, and other chemical constituents), or combinations thereof, which is known in the art and suitable for use in candles for imparting an odor, aroma, or fragrance. In some embodiments, suitable natural and synthetic fragrance/flavor substances may include those compiled by the U.S. Food and Drug Administration in Title 21 of the Code of Federal Regulations, Sections 172.510 and 172.515 respectively. In some embodiments, suitable fragrances may comprise spice oil, flower oil, fruit oil, and the like. In some embodiments, suitable fragrances may comprise fragrance components, such as for example benzaldehydes, phenols, cinnamic aldehydes and esters, octadienes, dienes, cyclohexadienes, terpenes, and the like.

As mentioned above, it should be understood that the air filter 104 described herein is not to be construed as limited solely to treating air within buildings and detached homes, but rather the air filter 104 may be used for any system that may require filtering or conditioning of large volumes of air such as respirators, air purifiers, industrial exhaust filters, and the like. Moreover, the air filter 104 may be incorporated into HVAC systems other than as illustrated in FIG. 1, such as, by way of non-limiting example, central HVAC systems, rooftop HVAC systems, wall-mounted HVAC systems, as well as portable HVAC systems, and the like.

Methods for forming an air filter 104 configured for use in embodiments of the HVAC system 108 can include coupling a first media layer 310 with a second media layer 312, the first media layer 310 comprising uniformly disposed pleats, and the second media layer 312, comprising a woven fiber material, so as to form a compound filter medium 308, incorporating one or more support layers, such as wire mesh 320, into the compound filter medium 308. This advantageously imparts a relatively greater structural integrity to the air filter. Extending a support frame 304 along a perimeter of the filter medium 308; and configuring the support frame 304 to retain the compound filter medium 308 and orient the air filter within a HVAC system.

Methods for forming the compound air filter 104 can further include molding a rim 316 onto the perimeter such that the compound filter medium is retained therein. Methods for forming the compound air filter 104 can further include extending lines of suitable adhesive along a width of the first media layers, perpendicular to the pleats, so as to adhere the second media layer to the first media layer.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims

What is claimed:

1. An air filter to remove airborne molecular contaminants and volatile organic compounds (VOCs) from air within an enclosed space, comprising:
    a support frame comprising a shape and size configured for orienting the air filter within a heating, ventilation, and air conditioning (HVAC) system;
    a compound filter medium comprising at least two filter media layers, that are retained within the support frame and configured to remove the airborne molecular contaminants and VOCs from the air flowing through the HVAC system, at least one of the at least two media layers comprises of a multiplicity of pleats, wherein a first media layer of the at least two media layers includes embossed shapes disposed in a parallel direction with airflow and between adjacent pleats of the multiplicity of pleats so as to maintain the multiplicity of pleats in a spaced configuration, wherein the embossed shapes are longitudinally aligned such that apices of adjacent pleats contact one another, and each pleat includes a first embossed shape protruding from a first side and a second embossed shape protruding from a second side opposite the first side, and wherein a second media layer is comprised of a woven material adhered to a down-stream side of the first media layer with respect to the airflow; and
    a support layer coupled with the compound filter medium and configured to maintain a uniform distribution between the multiplicity of pleats, wherein a first support layer of the one or more support layers includes a wire mesh that is co-pleated and configured to provide reinforcing support.

2. The air filter of claim 1, wherein at least one of the at least two filter media layers is configured to remove the VOCs from the air.

3. The air filter of claim 1, wherein the filter includes an electrostatic component.

4. The air filter of claim 1, wherein one of the at least two filter media layers is configured to maintain a uniform distribution of the multiplicity of pleats.

5. A method of removing airborne molecular contaminants and volatile organic compounds (VOCs) from air, the method comprising:
    coupling a first media layer, comprising uniformly disposed pleats, with a second media layer, comprising a woven fiber material, so as to form a compound filter medium, wherein the first media layer includes embossed shapes disposed in a parallel direction with airflow and between adjacent pleats so as to maintain the pleats in a spaced configuration, wherein the embossed shapes are longitudinally aligned such that apices of adjacent pleats contact one another, and each pleat includes a first embossed shape protruding from a first side and a second embossed shape protruding from a second side opposite the first side, and wherein the second media layer is comprised of a woven material adhered to a down-stream side of the first media layer with respect to the airflow;

incorporating one or more support layers into the compound filter medium to impart structural integrity to the air filter, wherein a first support layer of the one or more support layers includes a wire mesh that is co-pleated and configured to provide reinforcing support;

extending a support frame along a perimeter of the compound filter medium; and configuring the support frame to retain the compound filter medium and orient the air filter within a heating, ventilation, and air conditioning (HVAC) system.

6. The method of claim 5, wherein extending further comprises molding a rim onto the perimeter such that the compound filter medium is retained therein.

7. The method of claim 5, wherein coupling further comprises extending lines of adhesive along a width of the first media layers, perpendicular to the pleats, so as to adhere the second media layer to the first media layer.

* * * * *